US010263237B2

(12) United States Patent
Yamaguchi et al.

(10) Patent No.: US 10,263,237 B2
(45) Date of Patent: Apr. 16, 2019

(54) CYLINDRICAL BATTERY, AND COLLECTOR MEMBER USED THEREFOR, AND MANUFACTURING METHOD THEREOF

(71) Applicant: Sanyo Electric Co., Ltd., Daito-shi, Osaka (JP)

(72) Inventors: Yuma Yamaguchi, Tokushima (JP); Takahiro Fukuoka, Tokushima (JP); Shuichi Yamashita, Tokushima (JP); Kyosuke Miyata, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 1 day.

(21) Appl. No.: 15/564,238

(22) PCT Filed: Mar. 18, 2016

(86) PCT No.: PCT/JP2016/001576
§ 371 (c)(1),
(2) Date: Oct. 4, 2017

(87) PCT Pub. No.: WO2016/174811
PCT Pub. Date: Nov. 3, 2016

(65) Prior Publication Data
US 2018/0130994 A1    May 10, 2018

(30) Foreign Application Priority Data

Apr. 27, 2015  (JP) ................................ 2015-090136

(51) Int. Cl.
*H01M 2/26*       (2006.01)
*H01M 10/04*      (2006.01)
(Continued)

(52) U.S. Cl.
CPC ............. *H01M 2/26* (2013.01); *H01M 2/263* (2013.01); *H01M 4/134* (2013.01); *H01M 4/80* (2013.01);
(Continued)

(58) Field of Classification Search
CPC .... H01M 2/26; H01M 2/263; H01M 10/0431; H01M 4/134; H01M 10/0525; H01M 10/0422; H01M 4/80
See application file for complete search history.

(56) References Cited

U.S. PATENT DOCUMENTS

2009/0305122 A1* 12/2009 Mitani ................ H01M 2/0413
429/94
2011/0052971 A1*  3/2011 Fujikawa ............... H01M 2/22
429/161
(Continued)

FOREIGN PATENT DOCUMENTS

JP       52-98937 A     8/1977
JP       57-1402 Y2     1/1982
(Continued)

OTHER PUBLICATIONS

International Search Report dated Jun. 21, 2016, issued in counterpart application No. PCT/JP2016/001576. (2 pages).

*Primary Examiner* — Stewart A Fraser
(74) *Attorney, Agent, or Firm* — Westerman, Hattori, Daniels & Adrian, LLP

(57) ABSTRACT

A cylindrical battery according to one aspect of the present invention includes an electrode body in which a negative electrode plate and a positive electrode plate to which a plurality of positive electrode leads is connected are wound with a separator interposed therebetween; an electrolyte liquid; a cylindrical outer can having a bottom portion which receives the electrode body and the electrolyte liquid; and a sealing body sealing an open portion of the outer can. The
(Continued)

positive electrode leads extend along an outer circumference portion of a collector member disposed on the electrode body and are connected to a surface of the collector member at an outer side of the battery. The collector member includes a collector plate to which the positive electrode leads are connected and a first insulating plate fitted to a surface of the collector plate at an inner side of the battery.

10 Claims, 3 Drawing Sheets

(51) Int. Cl.
*H01M 4/134* (2010.01)
*H01M 4/80* (2006.01)
*H01M 10/0525* (2010.01)
*H01M 2/02* (2006.01)
*H01M 4/66* (2006.01)
*H01M 10/0587* (2010.01)
*H01M 10/052* (2010.01)

(52) U.S. Cl.
CPC ... *H01M 10/0422* (2013.01); *H01M 10/0431* (2013.01); *H01M 10/0525* (2013.01); *H01M 2/022* (2013.01); *H01M 4/661* (2013.01); *H01M 4/663* (2013.01); *H01M 10/052* (2013.01); *H01M 10/0587* (2013.01)

(56) References Cited

U.S. PATENT DOCUMENTS

| | | | | |
|---|---|---|---|---|
| 2011/0151297 A1* | 6/2011 | Shimizu | ............... | H01M 2/023 429/94 |
| 2012/0135285 A1* | 5/2012 | Iwama | ............... | H01M 2/26 429/94 |
| 2017/0346064 A1* | 11/2017 | Fukuoka | ............... | H01M 2/028 |

FOREIGN PATENT DOCUMENTS

| | | |
|---|---|---|
| JP | 11-312509 A | 11/1999 |
| JP | 2007-335232 A | 12/2007 |

* cited by examiner

Figure 3
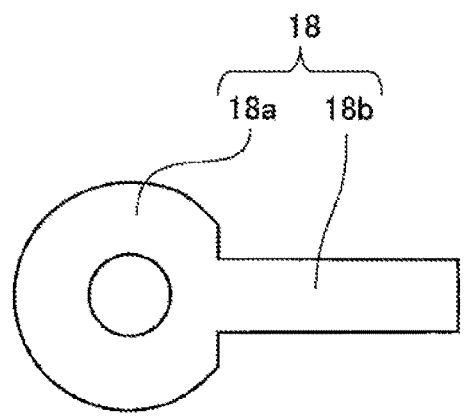
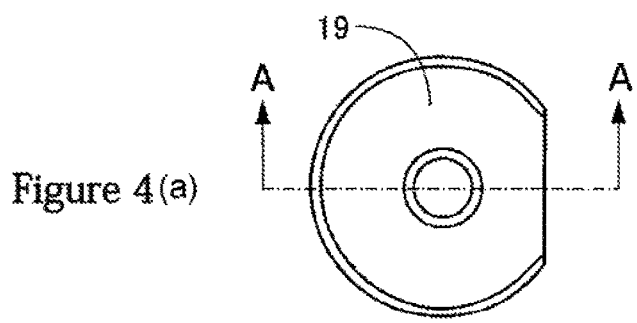
Figure 4(a)
Figure 4(b)
Figure 5
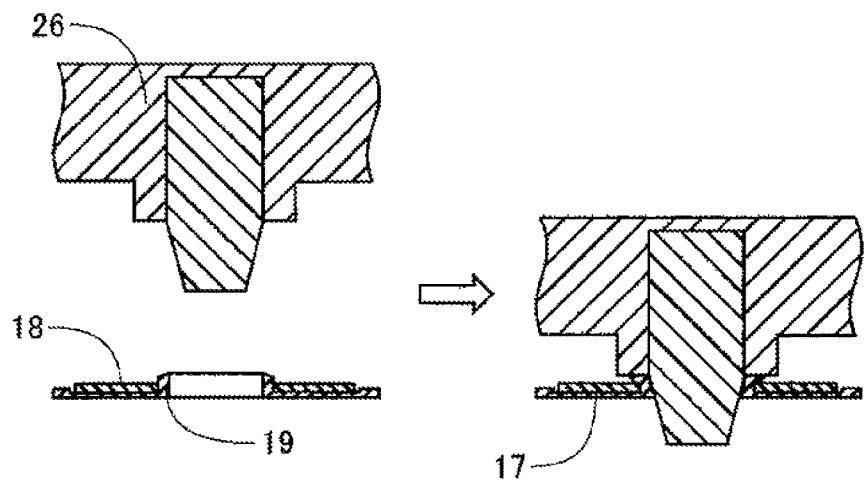

CYLINDRICAL BATTERY, AND COLLECTOR MEMBER USED THEREFOR, AND MANUFACTURING METHOD THEREOF

TECHNICAL FIELD

The present invention relates to a cylindrical battery having a collector member to which a plurality of positive electrode leads extending from an electrode body is electrically connected, and to a collector member used therefor and a manufacturing method thereof.

BACKGROUND ART

In recent years, non-aqueous electrolyte secondary batteries having a high energy density have been widely used as drive power sources for high output applications, such as an electric power tool, an electric assist bicycle, and a hybrid electric automobile. The non-aqueous electrolyte secondary battery is roughly classified based on its outer shape or outer package, into a cylindrical battery, a square battery, and a pouch type battery. Since having a strong resistance against impact from the outside and being easily assembled into a battery pack using many batteries, the cylindrical battery is preferably used for the above applications.

The cylindrical battery is formed in such a way that after an electrode body formed by winding a negative electrode plate and a positive electrode plate with at least one separator interposed therebetween is inserted into an outer can, an open portion thereof is sealed by a sealing body. In a general cylindrical battery, since the sealing body is used as a positive electrode external terminal, the positive electrode plate in the electrode body and the sealing body are required to be electrically connected to each other. Hence, as a method for this purpose, a method in which a lead connected to the positive electrode plate is connected to the sealing body has been mainly used in the non-aqueous electrolyte secondary battery.

However, according to the method described above, a collector portion of the positive electrode plate is limited to a connection portion of the positive electrode lead. Hence, even if the length of the positive electrode plate is increased, sufficient output characteristics may not be obtained in some cases. Accordingly, a plurality of leads is connected to the positive electrode plate so as to optimize a collector structure of the non-aqueous electrolyte secondary battery. As related art documents on a battery having a positive electrode plate to which a plurality of leads is connected, Patent Documents 1 to 3 may be mentioned.

Patent Document 1 has disclosed a secondary battery in which leads extending from an electrode body are overlapped with each other at one point, and this overlapped portion is connected to a sealing body.

Patent Document 2 has disclosed an electrode winding type battery in which a plurality of leads extending from an electrode body is electrically connected to an electrically conductive member disposed on the electrode body. The electrically conductive member is formed of a nut and a bolt having a flange portion, and the leads extending from the electrode body are each bent onto the flange portion of the bolt and are then fixed between the bolt and the nut.

Patent Document 3 has disclosed a nickel cadmium battery in which a plurality of electrode plate tabs extending from a spiral electrode group is connected to an intermediate plate functioning as a collector plate. Between the electrode group and the intermediate plate, an insulating plate is disposed, and many arc-shaped openings into which the electrode plate tabs are to be inserted are provided in the intermediate plate and the insulating plate. The electrode plate tabs inserted into the arc-shaped openings are bent on the intermediate plate and are connected thereto.

CITATION LIST

Patent Document

Patent Document 1: Japanese Published Unexamined Patent Application No. 2007-335232
Patent Document 2: Japanese Published Unexamined Patent Application No. 11-312509
Patent Document 3: Japanese Examined Utility Model Registration Application Publication No. 57-1402

SUMMARY OF INVENTION

Technical Problem

Compared to the case in which one lead is connected to the sealing body, as disclosed in Patent Document 1, the plurality of leads is not easily connected to the sealing body. In addition, when the positions of the leads on the electrode body are varied because of the variation in thickness of the electrode plate and the like, it becomes difficult to continuously perform a step of connecting the plurality of leads to the sealing body under the same condition, and the problem of degradation in productivity may arise in some cases.

Since the bolt and the nut, which fix the plurality of leads therebetween, are used as an external terminal in Patent Document 2, a step of connecting the leads to the sealing body may be omitted. However, according to the technique disclosed in Patent Document 2, since the bolt and the nut, which have no contribution to charge and discharge, occupy a large space in the battery, the battery capacity is decreased. In particular, when the technique disclosed in Patent Document 2 is applied to a compact battery, the problem described above becomes more serious.

In the structure as disclosed in Patent Document 3 in which the plurality of electrode plate tabs is connected onto the intermediate plate, and the intermediate plate and the sealing body are electrically connected with a lead, a plurality of electrode plate tabs is not required to be connected to the sealing body. However, when the intermediate plate and the insulating plate are overlapped with each other, since the opening positions thereof are required to be aligned with each other, and electrode plate tabs is also required to be inserted into the respective arc-shaped openings, the productivity may be disadvantageously degraded in some cases. In addition, when the opening area of the intermediate plate is increased in order to easily insert the electrode plate tabs thereinto, the electric resistance of the intermediate plate may be unfavorably increased in some cases.

Solution to Problem

In order to solve the problem described above, a cylindrical battery according to one aspect of the present invention comprises: an electrode body in which a negative electrode plate and a positive electrode plate to which a plurality of positive electrode leads is connected are wound with at least one separator interposed therebetween; an electrolyte liquid; a cylindrical outer can having a bottom portion configured to receive the electrode body and the electrolyte liquid; and a sealing body sealing an open portion of the outer can.

The positive electrode leads extend along an outer circumference portion of a collector member disposed on the electrode body and are connected to a surface of the collector member at an outer side of the battery, and the collector member includes a collector plate to which the positive electrode leads are connected and a first insulating plate fitted to a surface of the collector plate at an inner side of the battery.

Although a method for fitting the first insulating plate to the collector plate is not particularly limited, for example, the following method may be mentioned. When the first insulating plate and the collector plate are overlapped with each other, a protrusion protruding from a circumference portion of the collector plate is provided along an outer circumference portion of the first insulating plate. A method may be mentioned in which in addition, the collector plate and the first insulating plate are overlapped with each other so that the collector plate is disposed in a region surrounded by the protrusion, and the protrusion is hot-pressed so as to cover at least a part of the collector plate. When an opening is provided in the collector plate, a method may be mentioned in which a protrusion is inserted into the opening described above, and the protrusion protruding through the opening is hot-pressed so as to cover at least a part of the collector plate.

Besides the methods described above, an adhesive having an adhesion property may be disposed between the first insulating plate and the collector plate. Accordingly, the first insulating plate can be more reliably fitted to the collector plate. The adhesive can be applied to at least one surface of the first insulating plate and the collector plate. In addition, a double-sided tape in which an adhesive is applied to two surfaces of a substrate, such as a non-woven cloth, may be adhered between the first insulating plate and the collector plate.

As a method for fitting the first insulating plate to the collector plate, a method using hot pressing and a method using an adhesive may be used in combination.

Advantageous Effects of Invention

According to the present invention, a cylindrical battery having excellent productivity and quality can be provided although having a positive electrode plate to which a plurality of positive electrode leads is connected.

BRIEF DESCRIPTION OF DRAWINGS

FIG. 3 is a plan view of a collector plate used for a collector member according to one embodiment.

FIG. 4(a) is a plan view of a first insulating plate according to one embodiment, and FIG. 4(b) is a cross-sectional view taken along the line A-A.

FIG. 5 is schematic cross-sectional view showing the state in which the first insulating plate is fitted to the collector plate according to one embodiment.

DESCRIPTION OF EMBODIMENTS

Hereinafter, an embodiment of the present invention will be described using a cylindrical non-aqueous electrolyte secondary battery 10 shown in FIG. 1. However, the following embodiment will be described by way of example in order to facilitate the understanding of the technical scope of the present invention, and the present invention is not limited to this embodiment.

Figure 1:
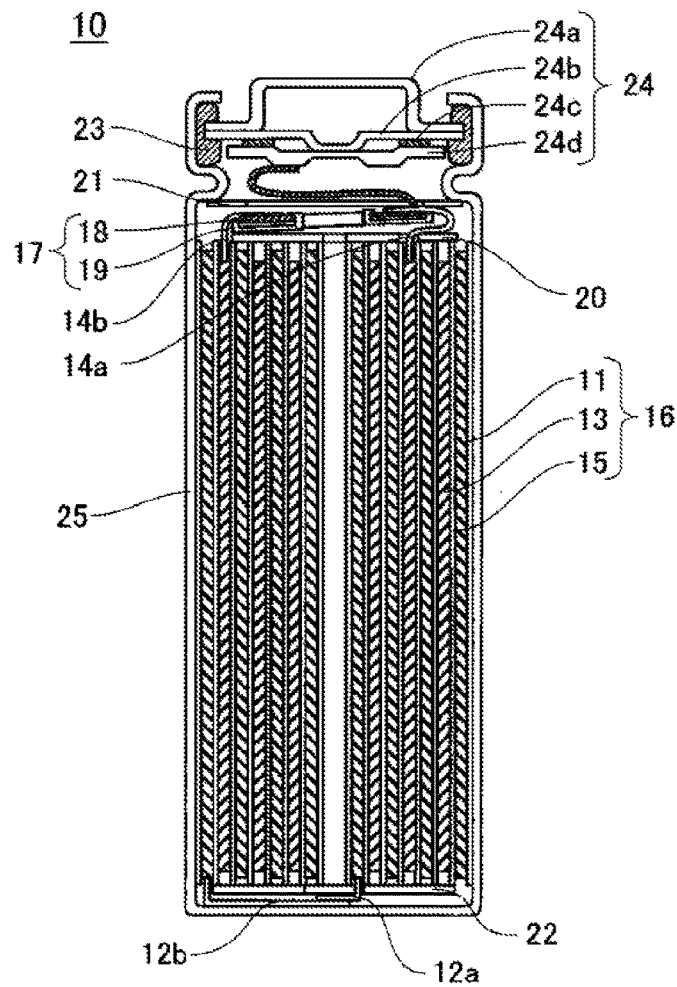
FIG. 1 is cross-sectional view of a cylindrical non-aqueous electrolyte secondary battery according to one embodiment.

The cylindrical non-aqueous electrolyte secondary battery 10 according to this embodiment includes, as shown in FIG. 1, a cylindrical outer can 25 having a bottom portion, an electrode body 16 inserted in the outer can 25, and a sealing body 24 sealing an open portion of the outer can 25. In the battery, a non-aqueous electrolyte in which an electrolyte salt is dissolved in a non-aqueous solvent is contained.

The sealing body 24 includes an external terminal cap 24a, an explosion-proof valve 24b, and a terminal plate 24d and is fixed to the open portion of the outer can 25 by caulking with a gasket 23 interposed therebetween. The external terminal cap 24a has a flange portion, and this flange portion is electrically connected to the explosion-proof valve 24b. The explosion-proof valve 24b and the terminal plate 24d are connected to each other at the central portions thereof with an insulating plate 24c interposed therebetween. This connection portion is fractured when the pressure inside the battery is increased to a predetermined value, so that a current path in the battery is interrupted. When the pressure inside the battery is further increased, the explosion-proof valve 24b is fractured, so that gases in the battery are released.

Figure 2:
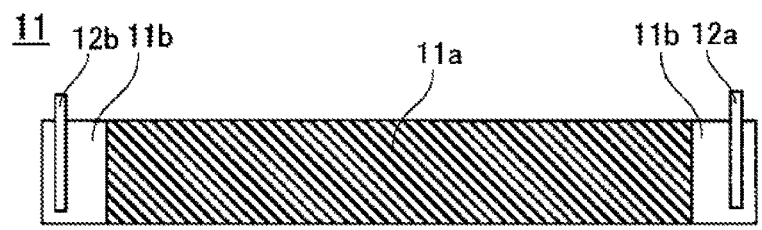
FIG. 2(a) is a plan view of a negative electrode plate according to one embodiment.
FIG. 2(b) is a plan view of a positive electrode plate according to an embodiment.
Figure 2:
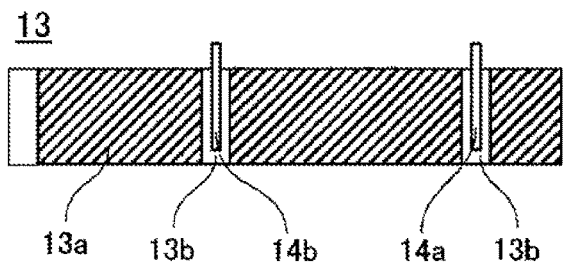

The electrode body 16 is composed of a negative electrode plate 11, a positive electrode plate 13, and at least one separator 15 and is formed by winding the negative electrode plate 11 and the positive electrode plate 13 with the separator 15 interposed therebetween. As shown in FIG. 2, to the negative electrode plate 11 and the positive electrode plate 13, negative electrode leads 12a and 12b and positive electrode leads 14a and 14b are connected, respectively. In the battery, the negative electrode leads 12a and 12b are bent so as to be parallel to a bottom surface of the outer can 25. The negative electrode lead 12b at an outer circumference side of the electrode body 16 is connected to the bottom portion of the outer can 25, and onto this connection portion, the negative electrode lead 12a at an inner circumference side is connected. The positive electrode leads 14a and 14b are connected to a collector member 17.

The collector member 17 is formed by fitting a first insulating plate 19 to a collector plate 18. As shown in FIG. 3, the collector plate 18 includes a flat plate portion 18a and a lead portion 18b. The positive electrode leads 14a and 14b are connected onto the flat plate portion 18a, and the lead portion 18b is connected to the terminal plate 24d of the sealing body 24. Accordingly, the positive electrode plate is electrically connected to the exterior terminal cap 24a. Between the electrode body 16 and the collector member 17, a second insulating plate 20 is disposed. Although the second insulating plate 20 is not always required, since an influence of heat generation on the electrode body 16 which occurs when the positive electrode leads 14a and 14b are connected to the collector member 17 can be reduced, the second insulating plate 20 is preferably used. At an upper portion and a lower portion of the electrode body 16 to which the collector member 17 is connected, an upper insulating plate 21 and a lower insulating plate 22 are disposed, respectively.

The collector plate 18 may be formed from one metal plate by integral molding. At the center of the flat plate portion 18a, an opening is preferably formed so that the electrolyte liquid is rapidly permeated into the electrode body when the liquid is charged thereinto. The collector plate is not always required to have a lead portion, and a lead plate may be connected to a collector plate formed only from a flat plate portion. For the collector plate, there may be used a metal which is able to stably exist in the electrolyte liquid even if exposed to a positive electrode potential. For example, when a non-aqueous electrolyte is used, aluminum or an aluminum alloy may be used.

The first insulating plate 19 is formed by molding an insulating resin. As the insulating resin, for example, a polypropylene resin may be used. As shown in FIG. 4, an opening is provided in the first insulating plate 19. When the collector plate has an opening, by providing the opening also in the first insulating plate, the electrolyte liquid can be rapidly permeated into the electrode body. Protrusions are provided along an outer circumference portion and an inner circumference portion of the first insulating plate 19. By the protrusion provided along the outer circumference portion, an internal short circuit between the collector plate 18 and the outer can 25 can be prevented. In this embodiment, at a part of the outer circumference portion of the first insulating plate 19 corresponding to that at which the lead portion 18b of the collector plate 18 is disposed, the protrusion is not provided. The protrusion is not always required to be provided all along the outer circumference portion of the first insulating plate, and although a region having no protrusion may be present through which the collector plate is not allowed to pass, the advantage described above can be obtained.

Figure 6A:
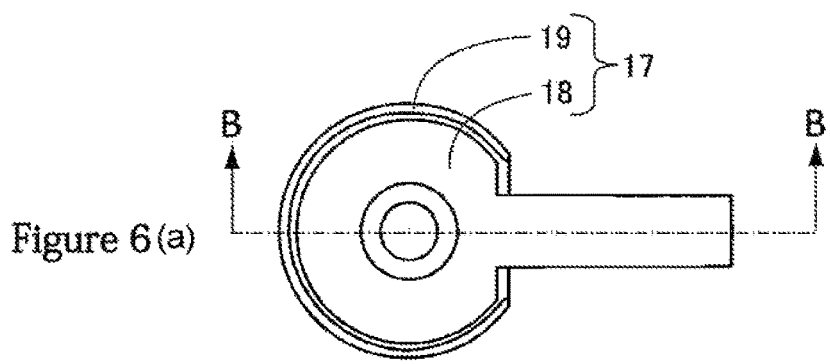
FIG. 6(a) is a plan view of the collector member according to one embodiment.
Figure 6B:
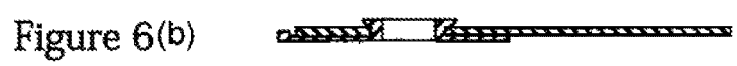
FIG. 6(b) is a cross-sectional view taken along the line B-B.
Figure 7A:
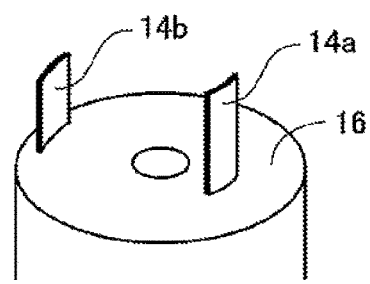
FIGS. 7(a) to 7(f) are perspective views sequentially showing steps of a method for connecting positive electrode leads extending from an electrode body to the collector plate according to one embodiment.
Figure 7B:
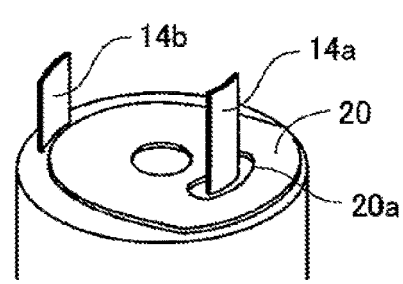
Figure 7C:
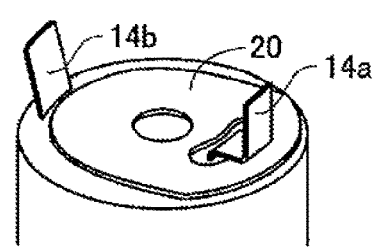
Figure 7D:
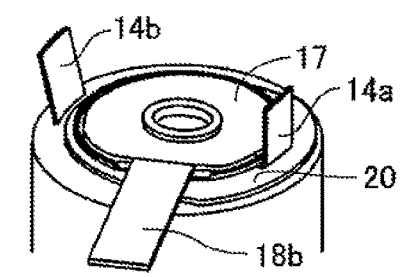
Figure 7E:
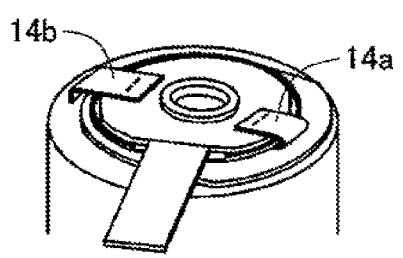
Figure 7F:
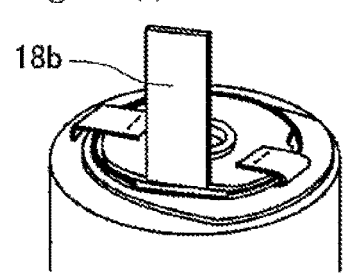

In this embodiment, the protrusion along the inner circumference portion is molded so as to be inserted into the opening of the collector plate 18. Accordingly, in order to fit the first insulating plate 19 to the collector plate 18, the protrusion along the inner circumference portion can be used. A method for fitting the first insulating plate 19 to the collector plate 18 is as follows. First, as shown in FIG. 5, the protrusion along the inner circumference portion of the first insulating plate is inserted into the opening of the collector plate 18, so that the first insulating plate 19 is fitted to the collector plate 18. Subsequently, a pin of a pressing jig 26 is inserted into the opening of the first insulating plate 19, and the protrusion along the inner circumference portion is hot-pressed. A surface temperature of the pressing jig in this case is preferably set to 120° C. to 180° C. By performing the hot pressing as described above, the protrusion along the inner circumference portion of the first insulating plate is molded so as to cover the surface of the collector plate 18. In FIG. 6, the collector member 17 formed by the hot pressing is shown.

The first insulating plate may also be formed in advance by injection molding of an insulating resin to have a shape shown in FIG. 6. As the insulating resin, when a resin, such as a polypropylene, having an elasticity is used, the first insulating plate has an elasticity. Hence, a protrusion of the first insulating plate having an outer diameter larger than the inner diameter of the opening of the collector plate can be pressure-inserted thereinto.

In this embodiment, although the first insulating plate is fitted to the collector plate using the protrusion along the inner circumference portion of the first insulating plate, the protrusion provided along the outer circumference portion of the first insulating plate may also be used. When hot pressing is used, by bending a front portion of the protrusion along the outer circumference portion to an inner circumference portion side so as to cover the collector plate, the first insulating plate can be fitted to the collector plate. The first insulating plate may also be formed in advance by injection molding of an insulating resin to have a shape in which the front portion of the protrusion along the outer circumference portion is bent to the inner circumference portion side.

As a method to fit the first insulating plate to the collector plate, an adhesive may also be used. For example, a method in which an adhesive is applied to one of the surfaces of the collector plate and the first insulating plate may be mentioned. By application of an adhesive, displacement of the collector plate on the first insulating plate during pressing can be prevented. When an adhesive is used, although hot pressing is preferably performed in combination therewith, as a method to fit the first insulating plate to the collector plate, an adhesive only may also be used. As the adhesive, for example, rubber-based adhesives, and thermoplastic resins, such as an acrylic resin, a vinyl resin, a fluorine resin, and a polyamide resin, may be used. In addition, thermo-setting resins, such as an amino resin, a phenol resin, a polyester resin, and an epoxy resin, may also be used. As a method to dispose an adhesive between the collector plate and the first insulating plate, besides the method in which an adhesive is applied as described above, a double-sided tape in which an adhesive is applied to two surfaces of a substrate, such as a non-woven cloth, may also be used.

A method for connecting the positive electrode leads to the collector member will be described with reference to FIG. 7. From the electrode body 16 obtained by the winding, two positive electrode leads extend (FIG. 7(a)). First, while the first positive electrode lead 14a at an inner circumference side of the electrode body is inserted in a through-hole 20a, the second insulating plate 20 is disposed on the electrode body 16 (FIG. 7(b)). Next, the positive electrode leads 14a and 14b are bent outside the electrode body 16 (FIG. 7(c)), and the collector member 17 is then disposed (FIG. 7(d)). Since the positive electrode leads 14a and 14b are bent in an outer circumference side direction of the electrode body 16, a space in which the collector member 17 is disposed can be secured. Furthermore, the positive electrode leads 14a and 14b are bent onto the collector member 17 so as to be connected thereto (FIG. 7(e)). As a connection method, laser welding may be used. Finally, in order to insert the electrode body 16 into the outer can 25, the lead portion 18b is bent at an angle of 90° (FIG. 7(f)).

Next, formation methods and constituent materials of the negative electrode plate 11, the positive electrode plate 13, the separator 15, and the non-aqueous electrolyte, each of which can be used for the cylindrical non-aqueous electrolyte secondary battery 10 according to this embodiment, will be described.

The negative electrode plate 11 includes a negative electrode collector and negative electrode mixed agent layers 11a formed on two surfaces of the negative electrode collector. In this embodiment, although the negative electrode leads 12a and 12b are connected respectively to negative electrode collector exposed portions 11b provided at two end portions of the negative electrode plate 11, the negative electrode leads may be connected only to one of the two end portions described above. The number of the negative electrode leads is not particularly limited. As the negative electrode collector, copper foil is preferably used. The negative electrode mixed agent layer 11a may be formed in such a way that a negative electrode mixed agent slurry containing a negative electrode active material is applied on the negative electrode collector and then dried. To the negative electrode mixed agent slurry, besides the negative electrode active material, for example, a binding agent and an electrically conductive agent may also be added. The negative electrode mixed agent layers 11a thus formed are compressed using a roller machine, and an electrode plate obtained after the compression is then cut to have predetermined dimensions, so that the negative electrode plate 11 is obtained.

As the negative electrode active material, a carbon material and a metal material, each of which is able to occlude and release lithium ions, may be used. As the carbon material, for example, graphite, such as natural graphite and artificial graphite, may be mentioned. As the metal material, silicon and tin and an oxide thereof may be mentioned. The carbon material and the metal material may be used alone, or at least two types thereof may be used by mixing. For example, graphite and silicon oxide may be used by mixing.

The positive electrode plate 13 includes a positive electrode collector and positive electrode mixed agent layers 13a formed on two surfaces of the positive electrode collector. In this embodiment, although the first positive electrode lead 14a and the second positive electrode lead 14b are connected respectively to two positive electrode collector exposed portions 13b provided in the positive electrode plate 13, the number of the positive electrode leads is not particularly limited to that of this embodiment, and at least three positive electrode leads may also be used. As the positive electrode collector, aluminum foil is preferably used. The positive electrode mixed agent layer 13a may be formed in such a way that a positive electrode mixed agent slurry containing a positive electrode active material is applied on the positive electrode collector and then dried. To the positive electrode mixed agent slurry, besides the positive electrode active material, for example, a binding agent and an electrically conductive agent may also be added. The positive electrode mixed agent layers 13a thus formed are compressed using a roller machine, and an electrode plate obtained after the compression is then cut to have predetermined dimensions, so that the positive electrode plate 13 is obtained.

As the positive electrode active material, a lithium transition metal composite oxide capable of occluding and releasing lithium ions may be used. As the lithium transition metal composite oxide, general formulas of $LiMO_2$ (M represents at least one of Co, Ni, and Mn), $LiMn_2O_4$, and $LiFePO_4$ may be mentioned. Those oxides may be used alone, or at least two types thereof may be used by mixing, and at least one selected from the group consisting of Al, Ti, Mg, and Zr may be added to the above oxides so as to substitute the transition metal element thereof.

As the separator, a fine porous film containing as a primary component, a polyolefin, such as a polyethylene (PE) or a polypropylene (PP), may be used. The fine porous sheet may be used as a single layer or a multilayer formed by laminating at least two layers. In a multilayer separator having at least two layers, a layer containing as a primary component, a polyethylene having a low melting point is preferably used as an intermediate layer, and a polypropylene excellent in oxidation resistance is preferably used as a surface layer. Furthermore, to the separator, inorganic grains of aluminum oxide ($Al_2O_3$), titanium oxide ($TiO_2$), and silicon oxide ($SiO_2$) may be added. Those inorganic grains may be supported in the separator and may also be applied to the surface of the separator together with a binding agent.

As the non-aqueous electrolyte, there may be used a liquid in which a lithium salt functioning as an electrolyte salt is dissolved in a non-aqueous solvent functioning as a solvent. In addition, a non-aqueous electrolyte using a gelled polymer instead of the non-aqueous solvent may also be used.

As the non-aqueous solvent, a cyclic carbonate ester, a chain carbonate ester, a cyclic carboxylic acid ester, and a chain carboxylic acid ester may be used, and at least two types thereof are preferably used by mixing. As the cyclic carbonate ester, for example, ethylene carbonate (EC), propylene carbonate (PC), and butylene carbonate (BC) may be mentioned. In addition, as is the case of a fluoroethylene carbonate (FEC), a cyclic carbonate ester in which at least one hydrogen atom is substituted by at least one fluorine atom may also be used. As the chain carbonate ester, for example, dimethyl carbonate (DMC), ethyl methyl carbonate (EMC), diethyl carbonate (DEC), and methyl propyl carbonate (MPC) may be mentioned. As the cyclic carboxylic acid ester, for example, γ-butyrolactone (γ-BL) and γ-valerolactone (γ-VL) may be mentioned, and as the chain carboxylic acid ester, for example, methyl pivalate, ethyl pivalate, methyl isobutyrate, and methyl propionate may be mentioned.

As the lithium salt, for example, there may be mentioned $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$. Among those mentioned above, $LiPF_6$ is particularly preferable, and the concentration thereof in the non-aqueous electrolyte is preferably 0.5 to 2.0 mol/L. Another lithium salt, such as $LiBF_4$, may also be mixed with $LiPF_6$.

INDUSTRIAL APPLICABILITY

According to the present invention, although having a positive electrode plate to which a plurality of positive electrode leads is connected, a cylindrical battery having excellent productivity and quality can be provided. Since being able to provide a cylindrical battery suitable for applications, such as an electric power tool, an assist bicycle, and a hybrid electric automobile, in which a high output is required, the present invention may be used for industrial purposes with a high probability.

REFERENCE SIGNS LIST 10 non-aqueous electrolyte secondary battery
11 negative electrode plate
12a, 12b negative electrode lead
13 positive electrode plate
14a, 14b positive electrode lead
15 separator
16 electrode body
17 collector member
18 collector plate
18a flat plate portion
18b lead portion
19 first insulating plate
20 second insulating plate
24 sealing body
25 outer can

The invention claimed is:

1. A cylindrical battery comprising:
   an electrode body in which a negative electrode plate and a positive electrode plate to which a plurality of positive electrode leads is connected are wound with a separator interposed therebetween;
   an electrolyte liquid;
   a cylindrical outer can having a bottom portion which receives the electrode body and the electrolyte liquid; and
   a sealing body sealing an open portion of the outer can,
   wherein the positive electrode leads extend along an outer circumference portion of a collector member disposed on the electrode body and are connected to a surface of the collector member at an outer side of the battery, and
   the collector member includes a collector plate to which the positive electrode leads are connected and a first insulating plate fitted to a surface of the collector plate at an inner side of the battery.

2. The cylindrical battery according to claim 1, wherein the collector plate includes a flat plate portion to which the positive electrode leads are connected and a lead portion connected to the sealing body, and the flat plate portion is provided with an opening.

3. The cylindrical battery according to claim 1, wherein the first insulating plate has along its outer circumference portion, a protrusion protruding to the outside of the battery, and the flat plate portion of the collector plate is disposed in a region surrounded by the protrusion.

4. The cylindrical battery according to claim 2, wherein the first insulating plate has a protrusion inserted into the opening of the collector plate, and the protrusion protruding through the opening covers at least a part of the flat plate portion of the collector plate.

5. The cylindrical battery according to claim 1, further comprising an adhesive disposed between the flat plate portion of the collector plate and the first insulating plate.

6. The cylindrical battery according to claim 1, further comprising between the first insulating plate and the electrode body, a second insulating plate having a through-hole into which at least one of the positive electrode leads is inserted.

7. The cylindrical battery according to claim 1, wherein the collector plate is formed from one of aluminum and an aluminum alloy.

8. A cylindrical battery collector member comprising: a collector plate having an opening; and an insulating plate fitted thereto,
   wherein the insulating plate has a protrusion inserted into the opening of the collector plate, and the protrusion protruding through the opening covers at least a part of the collector plate.

9. The cylindrical battery collector member according to claim 8, wherein the collector plate is formed from one of aluminum and an aluminum alloy.

10. A method for manufacturing a cylindrical battery collector member which is a method for manufacturing a cylindrical battery collector member in which an insulating plate is fitted to a collector plate having an opening, the method comprising:
    a step of inserting a protrusion of the insulating plate into the opening of the collector plate so as to fit the insulating plate to the collector plate; and
    a step of hot-pressing the protrusion so that the protrusion protruding through the opening covers at least a part of the collector plate.

* * * * *